June 15, 1954        E. J. BIJOLD        2,681,098
UTILITY CARRIER AND SEAT FOR WAGONS
Filed July 17, 1950        3 Sheets-Sheet 1
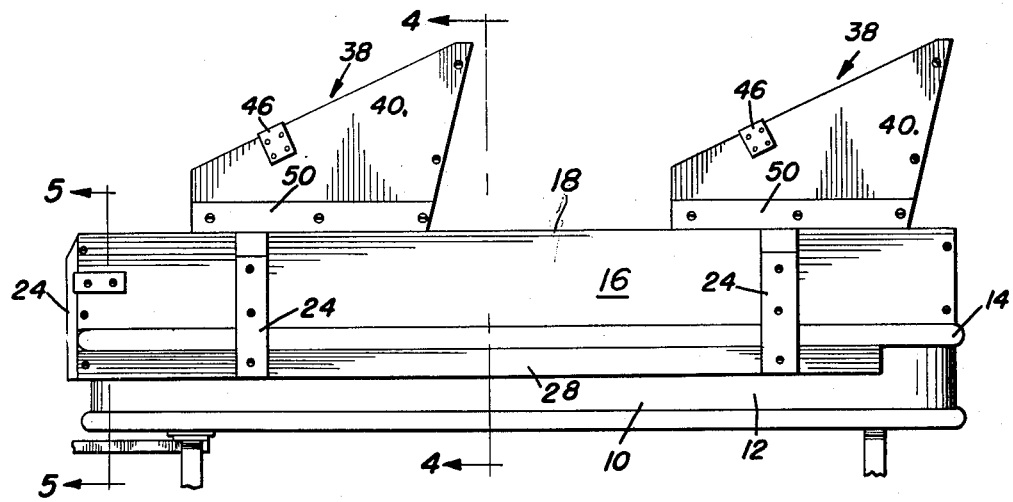
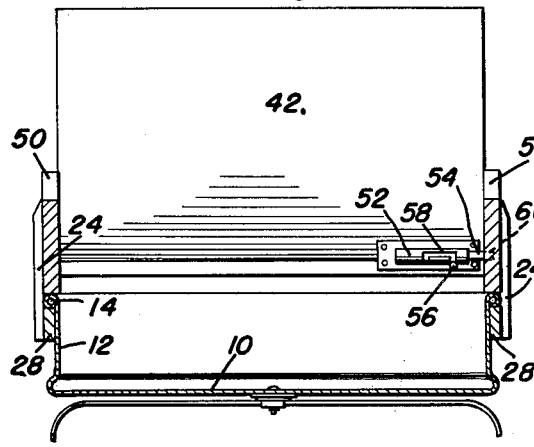
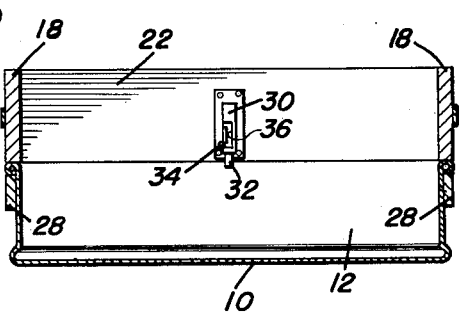
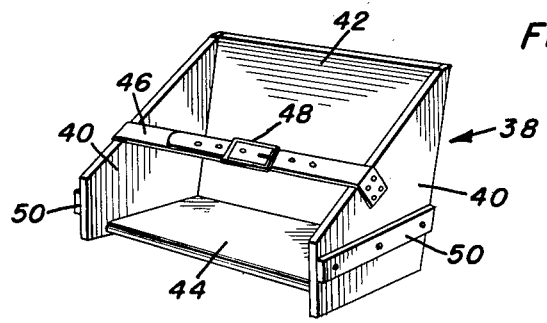
Eugene J. Bijold
INVENTOR.
BY *Clarence A. O'Brien*
and *Harvey B. Jacobson*
Attorneys June 15, 1954  E. J. BIJOLD  2,681,098
UTILITY CARRIER AND SEAT FOR WAGONS
Filed July 17, 1950  3 Sheets-Sheet 2

Eugene J. Bijold
INVENTOR.

BY *Clarence A. O'Brien*
and *Harvey B. Jacobson*
Attorneys

June 15, 1954     E. J. BIJOLD     2,681,098
UTILITY CARRIER AND SEAT FOR WAGONS Filed July 17, 1950     3 Sheets-Sheet 3

Eugene J. Bijold
INVENTOR.

BY *Clarence A. O'Brien*
*and Harvey B. Jacobson*
Attorneys

Patented June 15, 1954

2,681,098

UNITED STATES PATENT OFFICE 2,681,098

UTILITY CARRIER AND SEAT FOR WAGONS

Eugene J. Bijold, Proctor, Minn.

Application July 17, 1950, Serial No. 174,235

7 Claims. (Cl. 155—15)

This invention relates to new and useful improvements in utility carriers and the primary object of the present invention is to provide a seat attachment for wagons and the like that will safely support children.

Another important object of the present invention is to provide a supporting frame having seats applied thereto and embodying novel and improved means for detachably securing the frame to the upstanding flange of a wagon or wheeled carriage.

A further object of the present invention is to provide a seat support attachment for wagons including a frame and a plurality of seats that are longitudinally adjustable on the frame to accommodate children of various sizes.

A still further aim of the present invention is to provide a utility carrier that is simple and practical in construction, strong and reliable in use, neat and attractive in appearance, small and compact in structure, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of a wagon and showing the present invention applied thereto;

Figure 4 is a transverse vertical sectional view taken substantially on the plane of section line 4—4 of Figure 1;

Figure 5 is a transverse vertical sectional view taken substantially on the plane of section line 5—5 of Figure 1;

Figure 6 is a perspective view of one of the seat constructions used in the present invention;

Figure 2:
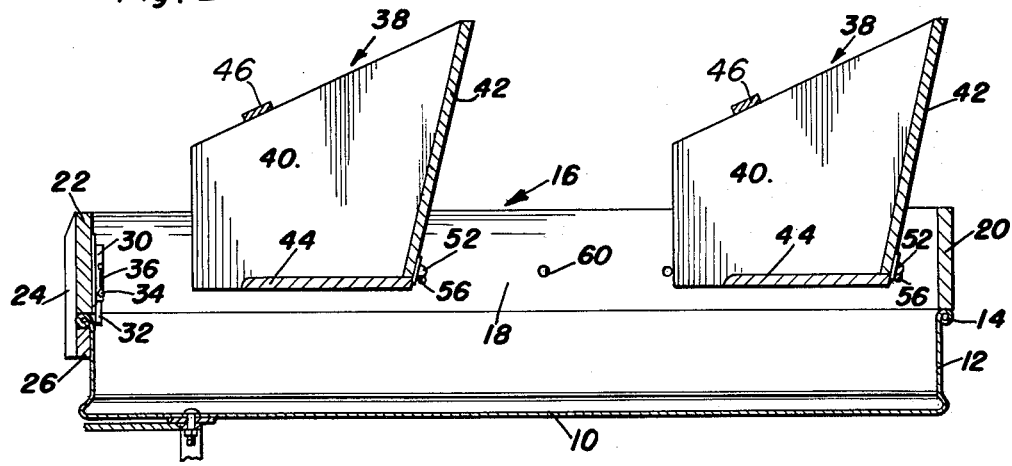
Figure 2 is a longitudinal vertical sectional view taken substantially on the plane of section line 2—2 of Figure 3.
Figure 3:
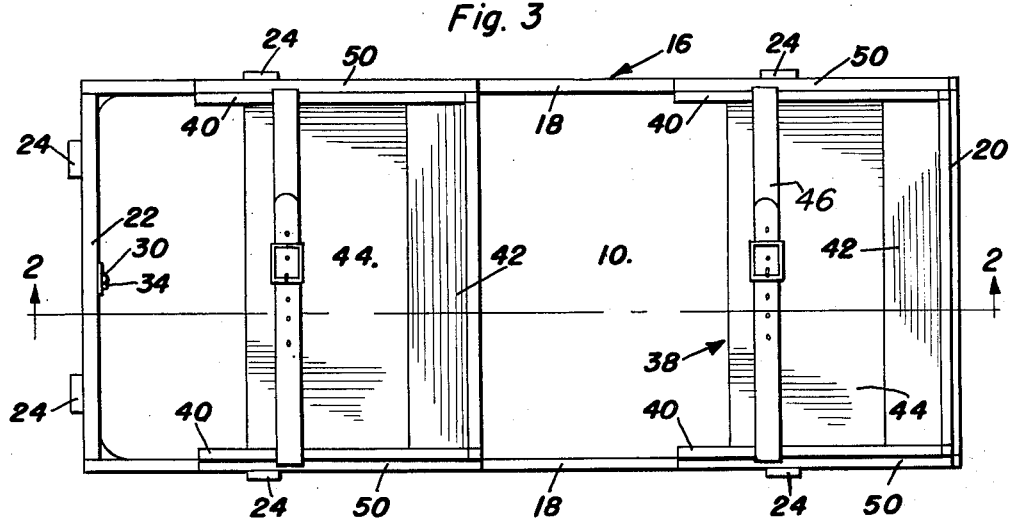
Figure 3 is a plan view of Figure 1.
Figure 7:
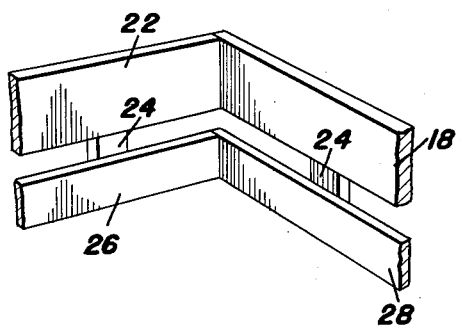
Figure 7 is a fragmentary perspective view of one corner of the frame illustrated in Figures 1-5 inclusive.

Referring now to the drawings in detail, and more particularly to Figures 1-7 inclusive, wherein for the purpose of illustration, there is disclosed one embodiment of the present invention. The numeral 10 represents a wagon or the bed portion of a wagon having an upstanding peripheral flange 12 whose upper end terminates in a beading 14.

An elongated substantially rectangular frame or support 16 includes a pair of elongated side members 18 that are connected at their ends by transverse or cross members 20 and 22. The lower edges of the members 18, 20 and 22 are supported upon the beading 14 as shown best in Figures 2, 4 and 5 of the drawings.

A plurality of hanger arms 24 are fixed to the outer faces of the side members 18 and the cross member 22. These hanger arms 24 include lower ends that extend well below the lower edges of the members 18 and 22. The lower ends of the hanger arms secured to the cross member 22 support a cross piece 26 whereas the lower ends of the hanger arms applied to the side members 18 support side pieces 28. The cross piece 26 includes an upper edge that is spaced parallel to the lower edge of the cross member 22 so that the beading at one end of the wagon will be received between the cross member 22 and cross piece 26. The upper edges of the side pieces 28 are also spaced parallel to the lower edges of the side members 18 so that the beading at the sides of the wagon may be received between the side pieces 28 and the side members 18 in order to retain the frame 16 in position to the wagon.

Means is provided for locking or detachably securing the frame 16 to the wagon and this means consists of a vertically disposed keeper 30 fixed to the inner face of the cross member 22. The keeper 30 slidably receives a locking bolt 32 having a laterally projecting lug 34 that is received in a bayonet slot 36 formed in the keeper 30. When the locking bolt 32 is extended downwardly, the same will ride against the flanged portion 12 to retain the beading at one end of the wagon within the space between the cross member 22 and cross piece 26, as shown best in Figure 2 of the drawing.

A plurality of seats 38 are associated with the frame 16. Each of these seats includes a pair of side sections 40, a back section 42 joining the side sections 40, and a seat section or panel 44 that is fixed between the side sections 40 and also fixed to the back section 42. A safety strap 46 forms a connection between the side sections 40 and is adjustable through the use of a suitable buckle 48. A pair of horizontally disposed supporting strips 50 are secured to the outer faces of the side sections 40 and are supported upon the upper edges of the side members 18, as shown best in Figures 1 and 4 of the drawings.

Means is provided for detachably securing the seats 38 to the frame 16 and for adjusting the seats longitudinally of the frame 16 and relative to each other. This means consists of keepers 52 fixed to the back sections 42. Locking bolts 54 are slidably carried by the keepers and include laterally projecting lugs or finger grips 56 that are received in bayonet slots 58 formed in the keepers. One of the side members 18 is provided with a plurality of longitudinally spaced openings or recesses 60 for selectively receiving the locking bolts 54 in order to retain the seats 38 in position to the frame 16 and in spaced predetermined relationship so that children of various sizes may utilize the seats and place their feet upon the bottom of the wagon bed 10.

Figure 8:
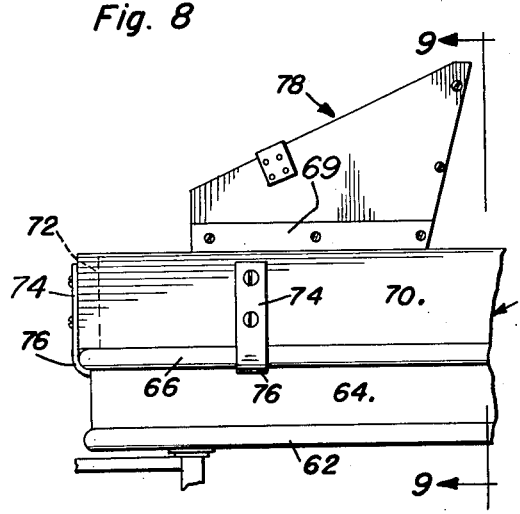
Figure 8 is a fragmentary elevational view of the wagon and showing the present invention in slightly modified form applied thereto.
Figure 9:
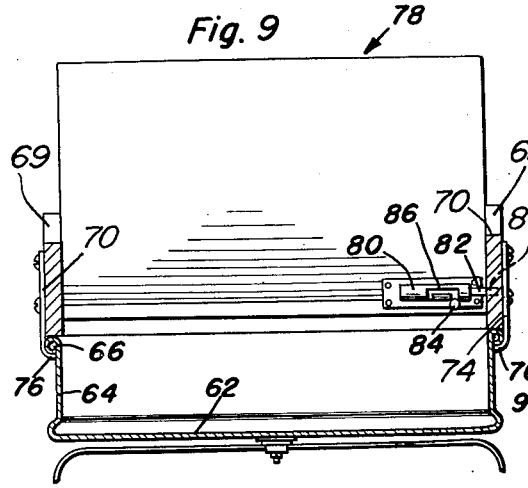
Figure 9 is a transverse vertical sectional view taken substantially on the plane of section line 9—9 of Figure 8.

Attention is next directed to Figures 8 and 9, wherein there is disclosed the present invention in slightly modified form. In this embodiment, the numeral 62 represents the wagon or wagon bed having an upstanding peripheral flange 64 that terminates in a beading 66 at its upper end.

An elongated substantially rectangular frame 68 including longitudinal side members 70 and transverse or cross members 72 terminally secured to the ends of the side members 70 is supported upon the wagon with the lower edges of the members 70 and 72 resting upon the beading 66.

A plurality of arms 74 are secured to the side members 70 and the end members 72. These arms 74 are preferably constructed of resilient material and include curved lower ends 76 that yieldingly grip the beading 66 to detachably secure the frame 68 to the wagon.

A group of seats 78, constructed similarly to the seats 38, are supported on the frame 68 by side pieces 69 at the sides of the seats that rest upon the upper edges of the side members 70. Each of the seats 78 supports a keeper 80 that slidably receives a locking bolt 82 having a laterally projecting lug 84 that moves in a bayonet slot 86 formed in the keeper. The bolts 82 are selectively received in a plurality of longitudinally spaced openings 86' provided in one of the side members 70.

Figure 10:
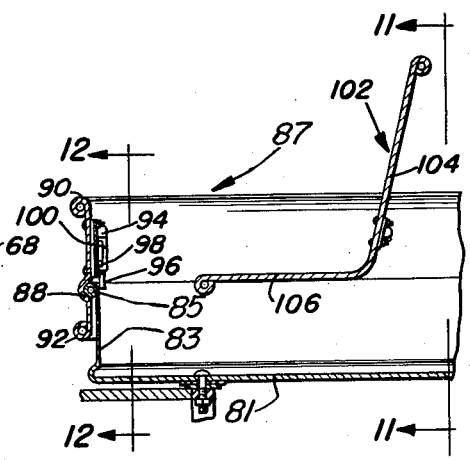
Figure 10 is a fragmentary longitudinal vertical sectional view taken substantially on the plane of section line 10—10 of Figure 11 to show the present invention in further modified form.
Figure 11:
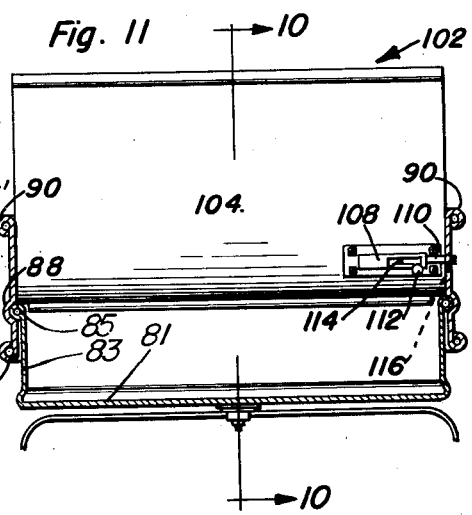
Figure 11 is a transverse vertical sectional view taken substantially on the plane of section line 11—11 of Figure 10; and, Figure 12 is a transverse vertical sectional view taken substantially on the plane of section line 12—12 of Figure 10.
Figure 12:
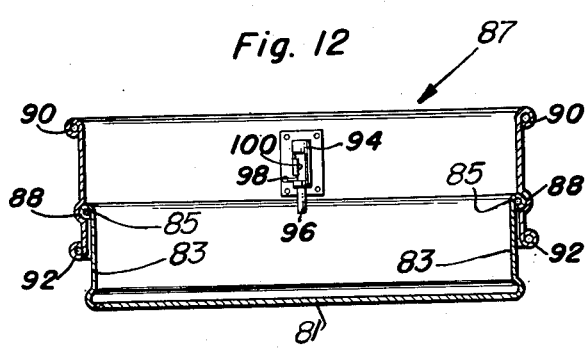

Reference is now directed to Figures 10, 11 and 12, wherein there is disclosed the present invention in further modified form. In this latest embodiment, the numeral 81 represents a wagon or wagon bed having an upstanding peripheral flange 83 whose upper end terminates in a beading 85.

An elongated substantially rectangular frame 87 includes a lower portion that surrounds or embraces the flange 83. A continuous channel 88 is provided in the frame 87 and receives the beading 85.

The upper and lower edges of the frame 87 are rolled upon themselves to provide upper and lower beadings 90 and 92. The beadings 90 and 92 will prevent children using the utility carrier from scratching their hands or tearing their clothing.

Means is provided for locking the frame 87 to the wagon 81. This means consists of a keeper 94 that is detachably secured to one end of the frame 87. The keeper slidably receives a locking bolt 96 having a laterally projecting lug 98 that enters a bayonet slot 100 in the keeper 94. As the locking bolt 96 is forced downwardly the same will ride against the flange portion 83, at one end of the wagon 81, to force the beading 85, at one end of the wagon, into the channel 88 at one end of the frame 87. Such an operation will prevent separation of the frame 87 from the wagon and the lower end of the frame 87 will prevent lateral and longitudinal movement of the frame 87 with respect to the wagon 81.

A plurality of seats 102 are associated with the frame 87 and include integrally formed back sections 104 and seat sections or panels 106. The seat sections 106 extend throughout the width of the frame 87 and are supported upon the beading 85 as shown best in Figure 11 of the drawings.

Each of the back sections 104 supports a keeper 108 that slidably receives a locking bolt 110. Lugs 112 project laterally from the locking bolts 110 and are received in bayonet slots 114 provided in the keepers 108. A plurality of longitudinally spaced openings 116 are provided in one of the side members of the frame 87 and selectively receive the locking bolts 110.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A utility carrier comprising an elongated open frame including a pair of spaced side members with upper edges, a plurality of longitudinally spaced seats having side walls whose lower ends are received in the frame, means carried by the side walls of the seats overlying and engaging the side members to support the seats upon the side members, and means for locking the seats to the side members, said seats having bottoms disposed well below said upper edges of said side members, whereby said side members will act in confining a user's legs within the frame.

2. For use with a wagon including an upstanding peripheral flange having a beading at its upper end, a utility carrier comprising an open frame embracing said flange, said frame including a continuous recess receiving the beading, means carried by said frame for locking the beading in the recess, and seats extending transversely across the frame and detachably secured to said frame.

3. For use with a wagon including an upstanding peripheral flange having a beading at its upper end, a utility carrier comprising an open frame embracing said flange, said frame including a continuous recess receiving the beading, means carried by said frame and engaging the beading for locking the beading in the recess, seats mounted on said frame and including seat panels supported upon the beading, and means carried by the seats engaging the frame for locking the seats to the frame.

4. The combination of claim 3 wherein said last mentioned means includes a locking bolt slidably carried by each of said seats, said frame including a side member having a plurality of longitudinally spaced openings therein for selectively receiving said locking bolt.

5. For use with a wagon including an upstanding peripheral flange having a beading at its upper edge, a substantially rectangular frame having its inner walls flush with the inner walls of said flange and being supported on said flange, horizontal side strips detachably secured to said frame and engaged under said beading to secure the frame to said flange, and a seat removably secured to said frame.

6. The combination of claim 5 wherein said frame includes a pair of side members, said seat extending transversely between said side members, and sliding lock bolts carried by said seat, said side members having apertures receiving said bolts.

7. For use with a wagon including an upstanding peripheral flange having a beading at its upper end, a frame embracing said flange and receiving the beading, means carried by the frame engaging the beading for locking the frame to the flange, a seat including side walls having lower ends entering the frame, side pieces secured to said side walls slidably supported on the frame, and means adjustably and removably securing said seats to said frame.

References Cited in the file of this patent

UNITED STATES PATENTS

| Number | Name | Date |
|---|---|---|
| 27,881 | Bird | Apr. 17, 1860 |
| 75,397 | Eddy | Mar. 10, 1868 |
| 532,716 | Woods | Jan. 15, 1895 |
| 759,809 | Farley | May 10, 1904 |
| 910,679 | Heintz | Jan. 26, 1909 |
| 1,844,401 | Kraeft | Feb. 9, 1932 |
| 2,126,698 | Eck | Aug. 16, 1938 |